(No Model.)

J. H. TEN EYCK.
HAMMOCK SUPPORT.

No. 315,354. Patented Apr. 7, 1885.

WITNESSES
INVENTOR
James H. Ten Eyck
By Myers
Attorneys

UNITED STATES PATENT OFFICE.

JAMES H. TEN EYCK, OF AUBURN, NEW YORK.

HAMMOCK-SUPPORT.

SPECIFICATION forming part of Letters Patent No. 315,354, dated April 7, 1885.

Application filed July 9, 1884. (No model.)

*To all whom it may concern:*

Be it known that I, JAMES H. TEN EYCK, a citizen of the United States of America, residing at Auburn, in the county of Cayuga and State of New York, have invented certain new and useful Improvements in Hammock-Supports, of which the following is a specification, reference being had therein to the accompanying drawings.

The object of my invention is to provide a ready and convenient means of suspending hammocks, especially in the absence of trees and other suitable supports to which to attach them; and it consists in the hinged standards A, having therein a suitable horizontal orifice, $b$, for securing a frictional roller or pulley, $b'$, for the passage of the suspending-rope C, hook B, rope C, pins D, and in the peculiar construction, combination, and arrangement of the parts, substantially as shown, and for the purpose described.

Figure 1:
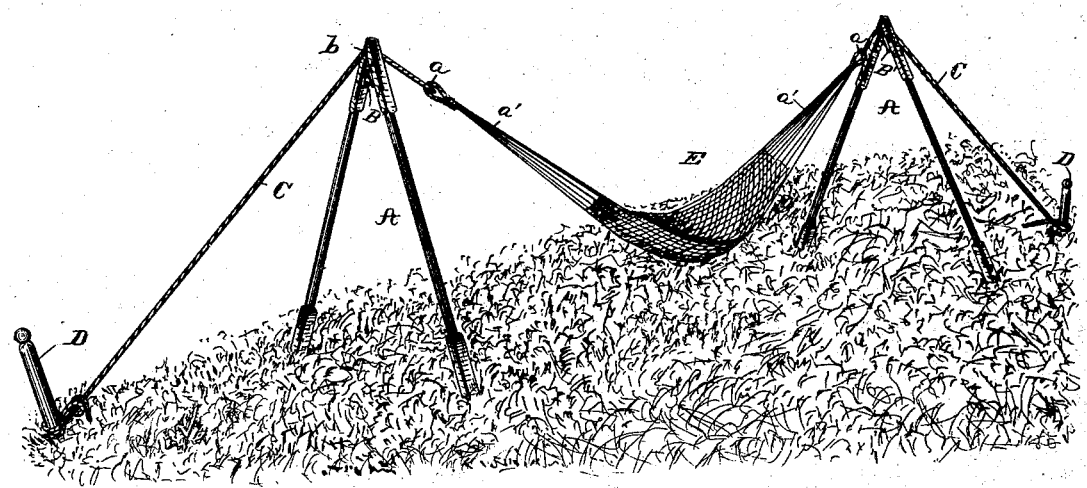
Figure 2:
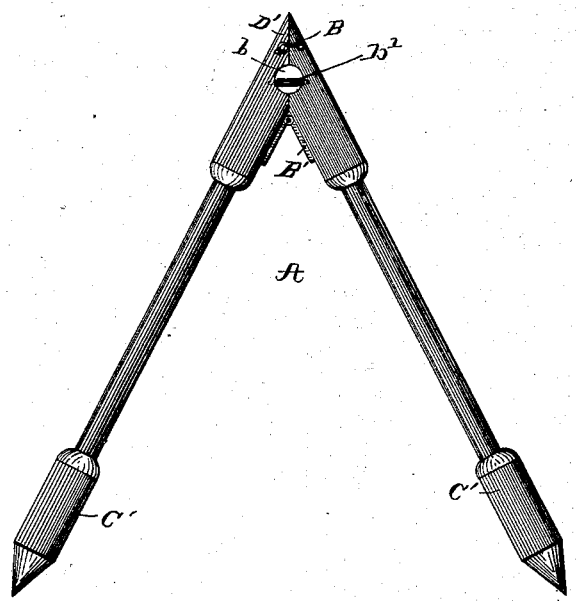

In the accompanying drawings, Figure 1 is a view in perspective of my improvement, and Fig. 2 is a front elevation of the supporting-standards.

In the organization of my invention I employ coincident standards A, two at either end, acting as a trestle for supporting the hammock. The standards A are each provided with a concave recess, $b$, in order that when they are conjoined by unfolding, and secured together by means hereinafter described, they conjointly form a circular recess for passage of the suspending-ropes. A friction roller or pulley, $b'$, is secured to the standards A in the recess $b$ by ordinary mechanical expedient, whereon the suspending-ropes are designed to rest. The object of the pulley $b'$, it is obvious, is to prevent friction and consequent wear of the suspending-rope. These standards are hinged at $B'$, and provided with the enlarged and tapered ends $C'$. They are thus enlarged and tapered in order that they may be driven into the earth, and the bevel $D'$ at their upper ends is designed, in connection with the hook B, to hold the bifurcated standards, forming, in connection with ropes C, a trestle rigidly in position. The hammock E is provided with the loop $a$, formed by union of the cords $a'$, for attaching thereto the suspending-ropes C, which are held steadfast by the pins D, which latter are driven into the earth, as shown. Thus constructed a hammock may be suspended upon any field and at any elevation, and for military purposes it must prove invaluable in many emergencies.

It is obvious that to prevent friction the rope C may be wrapped with leather or other non-conductive material.

Having thus fully described my invention, what I claim, and desire to secure by Letters Patent, is—

1. A hammock-support consisting of hinged standards A, having orifices $b$, roller $b'$, and hook B, substantially as shown and described.

2. The hinged standards A, having tapered ends $C'$, and recess $b$, in combination with frictional roller $b'$ and hook B, substantially as shown and described.

In testimony whereof I affix my signature in presence of two witnesses.

JAMES H. TEN EYCK.

Witnesses:
DANIEL L. HURLBUT,
GEO. A. SWAN.